United States Patent [19]

Cockeram

[11] 4,443,950
[45] Apr. 24, 1984

[54] PRECISION SAW BLADE ADJUSTMENT DEVICE

[76] Inventor: Eugene A. Cockeram, 5306 Boy Scout Rd., Florence, Oreg. 97439

[21] Appl. No.: 334,051

[22] Filed: Dec. 23, 1981

[51] Int. Cl.³ ............................................. B27G 23/00
[52] U.S. Cl. ..................... 33/185 R; 33/418; 33/465; 33/481
[58] Field of Search ................. 33/185 R, 180 R, 403, 33/418, 452, 465, 468, 469, 475, 478–481, 495, 202, 458, 500, 174 S, 174 R, 471

[56] References Cited

U.S. PATENT DOCUMENTS

| | | |
|---|---|---|
| 765,300 | 7/1904 | Williams .......................... 33/458 X |
| 1,510,219 | 9/1924 | Harding . |
| 2,631,376 | 3/1953 | Callahan ............................... 33/424 |
| 2,823,461 | 2/1958 | Schneider ......................... 33/202 X |
| 3,588,412 | 9/1972 | Keener . |
| 3,751,816 | 8/1973 | Hayes . |
| 4,123,846 | 11/1978 | Parras . |

Primary Examiner—Harry N. Haroian
Attorney, Agent, or Firm—Henderson & Sturm

[57] ABSTRACT

The invention relates to rotating saw blade adjustment devices in general, and more specifically to a very simple apparatus, comprising two metal brackets, which when used in conjunction with an adjustable triangle and/or framing square, can provide precision adjustments for either a radial arm saw or a table saw.

5 Claims, 9 Drawing Figures

PRECISION SAW BLADE ADJUSTMENT DEVICE

BACKGROUND OF THE INVENTION

There have been many patented devices developed in the woodworking and carpentry field to simplify the task of both the professional and casual craftsman. Examples of such devices may be seen by reference to U.S. Pat. No's. 4,123,846; 3,751,816; 1,510,219 and 3,688,412.

All of the above identified items have one thing in common, in that they are all intended to assist the user in making a precision alignment between a tool and a workpiece, or align workpieces, so that a precision operation can be performed upon them by a tool.

For precision cutting, the two most commonly employed power saws, are the radial arm saw, and the table saw. Although professional carpenters and woodworkers fully appreciate the need for a precision setting of the cutting blade with respect to the workpiece, they have been forced in the past to resort to a variety of adjustment techniques, employed a number of calibrating devices, to achieve the precise cutting angle of the blade that they desire. Since this problem has plagued the professionals in the craft for years, one can only imagine the magnitude of the problem which confronts the casual or week-end carpenter in attempting to obtain a precision cutting angle.

The following quotation which was taken from the September-October 1981, issue of "Fine Woodworking" magazine on page 74 further emphasises this point; "Most distributors I spoke with agree that woodworkers would have less trouble with their machines if they would read their owner's manuals, set the machines up properly and adjust them correctly to begin with."

Obviously there is a distinct need for a precision saw blade adjustment device which is simple to understand and operate, and which can be adapted to both the radial arm saw blade and the table saw blade to insure exact cuts.

The apparatus which forms the basis of the present invention, not only solves the problem stated above, but also satisfies the criteria that it can be used by professional or amatuer alike, with equal ease.

SUMMARY OF THE INVENTION

An object of the present invention is to provide a device which can be used to obtain precision blade cutting angles adjustments for power saws.

Another object of the present invention is to provide a blade adjustment apparatus which can be adapted to either a radial arm saw or a table saw.

A further object of the present invention is the provision of a blade saw adjustment apparatus, which can be used with equal ease by either a professional or amatuer woodworker.

Still another object of the present invention is the provision of a precision blade saw adjustment apparatus, comprising the smallest number of components possible, which can be used either alone, or in combination, to obtain a myriad number of blade angle adjustments.

A still further object of the present invention is the provision of a blade angle adjustment device, which has two major components, which can be joined together in several different ways, to accommodate both radial arm saws and table saws.

Yet another object of the present invention is the provision of a blade angle adjustment device, which when used in conjunction with an adjustable angle and/or drafting square can provide simple, and compound angle, blade adjustments.

These and other objects, advantages, and novel features of the invention will become apparent from the detailed description which follows, particularly when considered in light of the accompanying drawings.

DETAILED DESCRIPTION OF THE PREFERRED EMBODIMENT

Figure 1:
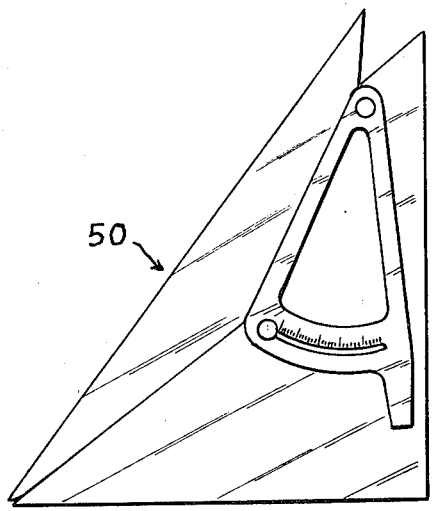
FIG. 1 is a front elevational view of an adjustable triangle that is to be used in conjunction with this invention.

As can best be seen by reference to FIG. 1, the precision saw blade adjustment mechanism, which forms the basis for the invention, is designated generally as 50, and comprises two major components in the form of an arbor arm 20, and a heel bar 30.

Figure 1A:
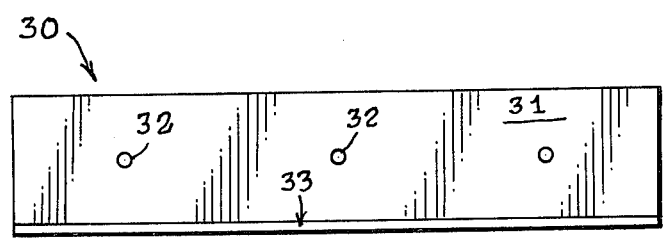
FIG. 1a is a combined front and side view of the heel bar of this invention.

The major components 20 and 30, are further provided with securing means 40, for joining them together in a variety of positions, to accommodate and adjust, either a radial arm saw 100, or a table saw 200. The securing means 40 illustrate in FIG. 1C, comprise a threaded bolt 41, a plurality of washers 42, and a wing nut 43; however, any suitable fastening means would suffice.

In the preferred embodiment, both the arbor arm 20, and the heel bar 30, are fabricated from heavy gage steel. The arbor arm 20, comprises an elongated rectangular member having a plurality of various sized apertures disposed therein. The spacing and dimensions of the apertures are designed to allow the two major components to be used, with either a radial arm saw, or a table saw.

Figure 1B:
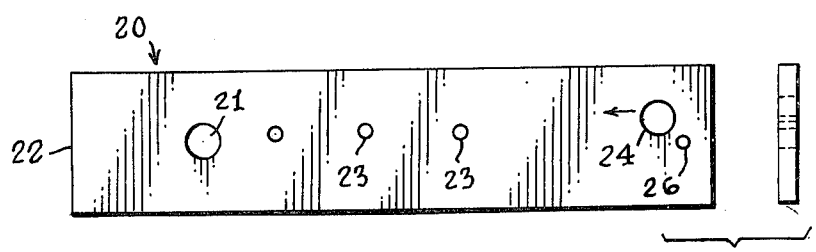
FIG. 1b is a combined front and side view of the arbor arm of this invention.
Figure 1C:
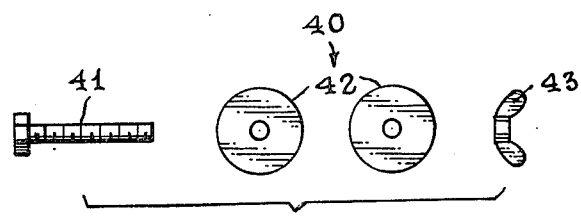
FIG. 1c is an exploded view of the securing means employed in this invention.

Looking at the arbor arm 20 in FIG. 1B, it can be seen that it is provided with; an enlarged centered aperture 21 proximate one end 22; a plurality of centered small apertures 23, disposed at spaced intervals along its length; an enlarged off-set aperture 24, spaced from it other end; and a single centered small aperture 26 disposed proximate the other end, and intermediate the off-set aperture 24 and the other end.

For a better understanding of the dimension and spacing of the apertures on the arbor arm, a prototype was build in the development of this invention which had the following specifications; height $2\frac{1}{2}''$; length $13\frac{5}{8}''$; thickness $\frac{1}{4}''$; the diameter of the enlarged centered aperture varied from $\frac{1}{2}''-\frac{3}{4}''$; the diameter of the off-set enlarged aperture was $\frac{5}{8}''$; the distance of the center of off-set enlarged aperture from its nearest end was $3\frac{1}{2}''$; and the diameter of all of the small apertures was $5/16''$.

The reason that the dimension of the enlarged centered aperture, varied, was to accommodate various sized arbors, as will be explained more fully further on in the specification.

Again referring to FIG. 1A, it can be seen that the heel bar 30, comprises an elongated member having an L-shaped configuration. The vertical leg 31 of the heel bar is further provided with a plurality of small centered apertures 32, disposed along its length. At least one of the apertures is disposed proximate each end of the vertical leg 31, and one in the center. The width of the horizontal leg 33 is approximately one-half the height of the vertical leg 31.

In the prototype mentioned supra, the dimension of the heel bar were as follows: thickness ⅛"; length 12"; the vertical leg was 2" high; the horizontal leg was 1" wide; and the diameter of the small aperture was 5/16".

Obviously, since the major components are used to arrive at precision settings, all of the external surfaces are smooth, and all of the edges form 90° angles.

The threaded bolt 41, is dimensioned to be received within the small apertures, in both the arbor arm and heel bar, and to cooperate with the washers 42 and nut 43, to join the major components together in a variety of positions.

It should be appreciated at the outset, that depending on the type of blade involved, and the particular angle desired, either or both of the major components will be employed, but it will be necessary to use the device in conjunction with at least a precision measuring triangle 50, and in some instances a carpenters framing square. The specific cooperation of the major components to arrive at the desired blade angle settings for different blades is illustrated in FIGS. 2 thru 6.

Figure 2:
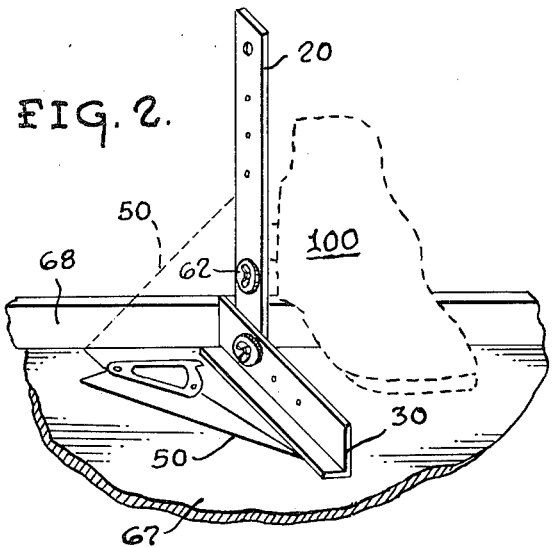
FIG. 2, is a perspective view showing how the adjustment apparatus would be utilized on a radial arm saw to set a perfect 90° cut.

FIG. 2, illustrates how the apparatus is used for a precision 90° cut with a radial saw 100. The blade (not shown) is removed from the radial arm saw 100, and is replaced by the arbor arm 20. The saw arbor 61 passes through the off-set enlarged aperture in the arbor arm, and the blade fastening means 62 are used to secure the arbor arm 20 in place of the blade. The precision adjustable triangle 50 (in phantom) is then used to determine the exact vertical angle of the arbor arm with respect to the saw table 67. The necessary adjustment to the blade are made to insure a 90° angle, and the adjustment stops, on the saw arbor are set. The heel bar 30 is then attached to the arbor arm 20 by the fastening means 40 passing through the single small aperture 26 in the arbor arm, and one of the small apertures in the heel bar 30.

The precision adjustable triangle (solid line) is then placed against the lower leg of the heel bar, and the rip fence 68, as shown in FIG. 2, to check the blade "heel", and insure that the arbor arm is positioned at a perfect 90° angle with respect to the rip fence. It should also be appreciated at this point, that by using the precision triangle 50, any cut to the right or left of center can be set with extreme accuracy. Once the settings have been made, it will insure the perfect blade travel desired when the arbor arm is replaced by the blade.

Figure 3:
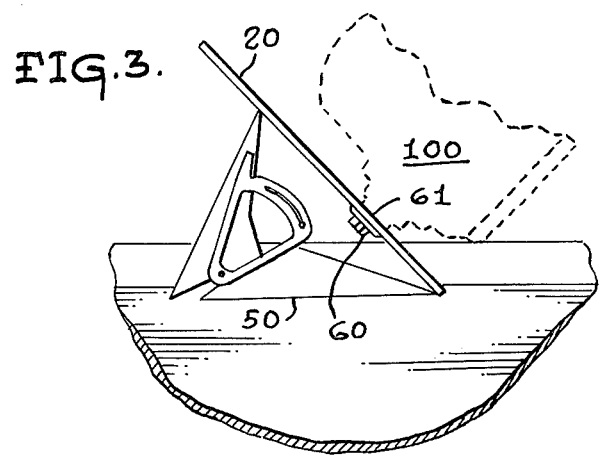
FIG. 3, is another perspective view showing a setting of other than 90° for a radial saw.

FIG. 3, illustrates how to employ only the arbor arm, in conjunction with the precision adjustable triangle, to set the radial saw blade at any angle from 45° to 90°. Again, the arbor arm replaces the saw blade, and the precision triangle is used to compare the angle of the arbor arm with respect to the desired cutting angle. The arbor arm angle is adjusted to coincide with the angle of the precision triangle in a well recognized manner, the arbor arm is then removed and is replaced by the blade.

Figure 4:
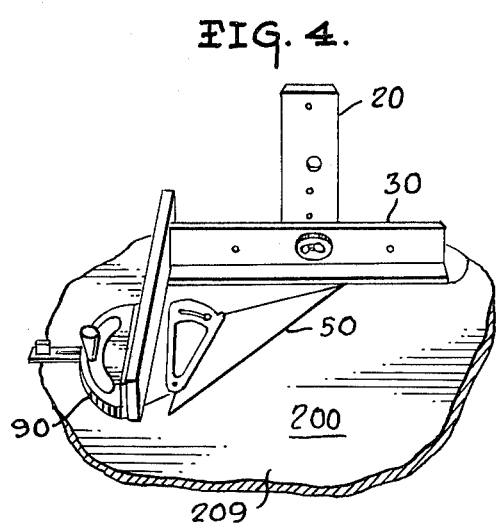
FIGS. 4 thru 6, are perspective views showing how the adjustment apparatus can also be adapted to a table saw as well as a radial saw.
Figure 5:
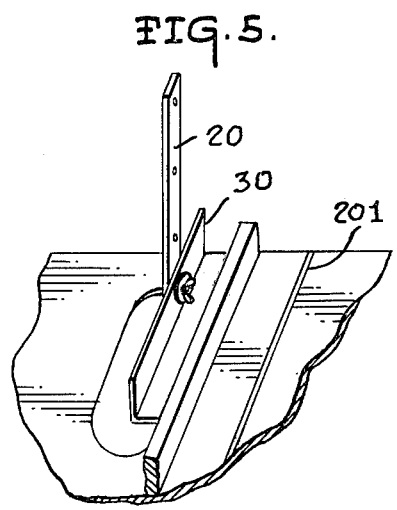
Figure 6:
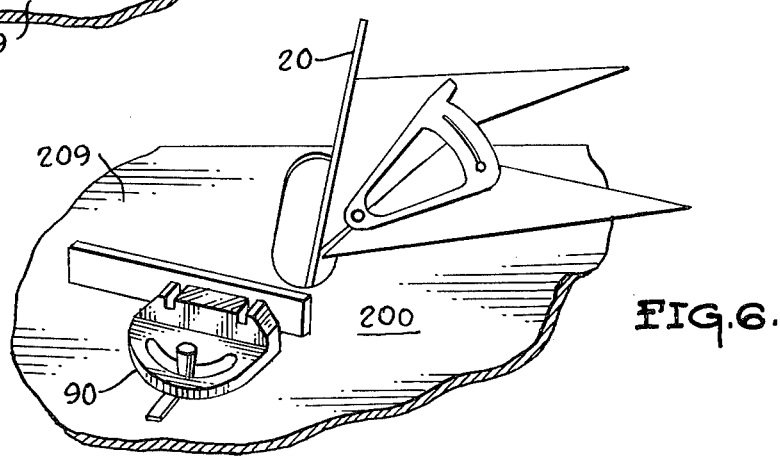

FIGS. 4 thru 6, illustrate how the apparatus is intended for use with a table saw. As was the case with the radial arm saw, the table saw blade is replaced by the arbor arm. After the arbor arm setting is adjusted to a 90° angle with respect to the table surface 209, by using the triangle 50, the heal bar is connected to the arbor arm. The standard miter guage 90 on the table saw is then used in conjunction with the precision triangle to set the blade ±45° from center. The stops are set, and the apparatus is replaced by the blade.

To set the table blade adjustment for use with a rip fence, the rip fence is first adjusted so that it is parallel with one of the transverse miter slots 201 on the table surface. With the heel bar in place move the rip fence, to the position illustrated in FIG. 5, and adjust the arbor arm until there isn't any clearance between the edge of the heel bar and face of the rip fence.

By using the apparatus as described, not only can various precision blade adjustments be made, but also the settings on the miter guage and power blade adjustment stops mechanisms can be calbrated so that they reflect the actual cutting angle of the blade. Furthermore, the blade angle can be set at any angle from 90° to 45° either side of center, and compound angle adjustments can be obtained by the use of the following chart:

| COMPOUND MITER FOR TABLE SAW - RADIAL ARM SAW | | | | | | |
|---|---|---|---|---|---|---|
| | 4 - SIDED MITER | | | 6 - SIDED MITER | | |
| WORK TILT | BLADE TILT | MITER GUAGE | ARM ANGLE | BLADE TILT | MITER GUAGE | ARM ANGLE |
| 5° | 44¾° | 85° | 5° | 29¾° | 87½° | 2½° |
| 10° | 44¼° | 80¼° | 9¾° | 29½° | 84¼° | 5¼° |
| 15° | 43¼° | 75½° | 14½° | 29° | 81¾° | 8¼° |
| 20° | 41¾° | 71¼° | 18¾° | 28¼° | 79° | 11° |
| 25° | 40° | 67° | 23° | 27¼° | 76½° | 13¼° |
| 30° | 37¾° | 63½° | 26¼° | 26° | 74° | 16° |
| 35° | 35¼° | 60¼° | 29¾° | 24½° | 71½° | 18¼° |
| 40° | 32½° | 57¼° | 32¾° | 22¾° | 69¾° | 20¼° |
| 45° | 30° | 54¾° | 35¼° | 21° | 67¾° | 22¼° |
| 50° | 27° | 52½° | 37¼° | 19° | 66¼° | 23¾° |
| 55° | 24° | 50¾° | 39¼° | 16¾° | 64¾° | 25¼° |
| 60° | 21° | 49° | 41° | 14½° | 63½° | 26½° |

| COMPOUND MITERS FOR TABLE SAW - RADIAL ARM SAW 8 - SIDE MITER | | | |
|---|---|---|---|
| WORK TILT | BLADE TILT | MITER GUAGE | ARM ANGLE |
| 5° | 22¼° | 88° | 2° |
| 10° | 22° | 86° | 4° |

COMPOUND MITERS FOR TABLE SAW - RADIAL ARM SAW
8 - SIDE MITER (continued)

| WORK TILT | BLADE TILT | MITER GUAGE | ARM ANGLE |
|---|---|---|---|
| 15° | 21½° | 84° | 6° |
| 20° | 21° | 82° | 8° |
| 25° | 20¼° | 80° | 10° |
| 30° | 19¼° | 78¼° | 11¾° |
| 35° | 18¼° | 76¾° | 13¼° |
| 40° | 17° | 75° | 15° |
| 45° | 15¾° | 73¾° | 16¼° |
| 50° | 14¼° | 72½° | 17¼° |
| 55° | 12½° | 71¼° | 18¾° |
| 60° | 11° | 70¼° | 19¾° |

MITER CUTS OR CROSS-BEVELS

| NUMBER OF SIDES | | NUMBER OF SIDES | | CUT ANGLE = ½ 360° ÷ No. of Sides |
|---|---|---|---|---|
| 3 | 60° | 7 | 25.72° | |
| 4 | 45° | 8 | 22½° | |
| 5 | 36° | 10 | 18° | True for Miter Cuts |
| 6 | 30° | 12 | 15° | and Cross-Bevels |

COMPOUND MITERS FOR RADIAL ARM SAW

| WORK TILT | 4 - SIDED MITER | | 6 - SIDES MITER | |
|---|---|---|---|---|
| | BLADE TILT | ARM ANGLE | BLADE TILT | ARM ANGLE |
| 15° | 43¼° | 14½° | 29° | 8¼° |
| 25° | 40° | 23° | 27¼° | 13¼° |
| 30° | 37¾° | 26¼° | 26° | 16° |
| 40° | 32¼° | 32¾° | 22¾° | 20¼° |
| 45° | 30° | 35¼° | 21° | 22¼° |
| 50° | 27° | 37½° | 19° | 23¾° |
| 60° | 21° | 41° | 14½° | 26¼° |

Miter and cross bevel cuts are used in multi-sided projects.
The formula to select the correct cut angle for any number of sides.
Cut angle = ½ 360° ÷ No. of sides.
This is true for miter cuts and cross bevels.

Having thereby disclosed the subject matter of this invention, it should be obvious that many substitutions, variations, and modifications of this device are possible in light of the above teachings. It is therefore to be understood that the invention as discribed should only be limited by the breadth and scope of the appended claims.

What I claim is:

1. A precision powered saw blade adjustment apparatus for use in combination with an adjustable triangle to obtain precision blade angle settings for powered saw blades, comprising a first major component in the form of an elongated rectangular member having two enlarged apertures, wherein at least one of the enlarged apertures is dimensioned to receive the arbor of a powered saw blade, and a plurality of small apertures disposed along its length between the said two enlarged apertures, a second major component comprising of an elongated L-shaped member, having a plurality of small aperatures disposed along the longitudinal center line of its vertical leg, and securing means dimensioned to be received within the said small apertures on the first and second major components to join the components together, whereby the two major components are substituted for the saw blade on the arbor, and used in conjunction with the adjustable triangle, to determine the angle of adjustment of the arbor required to produce a given blade setting.

2. An apparatus as in claim 1; wherein,
one of said enlarged apertures is centered on, and disposed proximate to, one end of said member.

3. An apparatus as in claim 2; wherein,
the plurality of small apertures on said first major component are disposed along the longitudinal center line of the component.

4. An apparatus as in claim 3; wherein,
the first major component is further provided with a single additional small aperture disposed proximate the other end of said rectangular member and intermediate the other of said enlarged apertures and said other end.

5. An apparatus as in claim 4; wherein,
the other of said enlarged apertures is disposed off-center from the longitudinal center line of the component.

* * * * *